(12) United States Patent
Ocalan et al.

(10) Patent No.: US 10,669,788 B2
(45) Date of Patent: Jun. 2, 2020

(54) ACTIVE STABILIZATION

(71) Applicant: SCHLUMBERGER TECHNOLOGY CORPORATION, Sugar Land, TX (US)

(72) Inventors: Murat Ocalan, Houston, TX (US); Jahir Pabon, Newton, MA (US); Nathaniel Wicks, Somerville, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 263 days.

(21) Appl. No.: 14/594,298

(22) Filed: Jan. 12, 2015

(65) Prior Publication Data
US 2016/0201405 A1  Jul. 14, 2016

(51) Int. Cl.
| | | |
|---|---|---|
| *E21B 17/10* | (2006.01) | |
| *F16D 13/40* | (2006.01) | |
| *E21B 7/06* | (2006.01) | |
| *E21B 41/00* | (2006.01) | |
| *E21B 47/024* | (2006.01) | |
| *F16H 1/28* | (2006.01) | |

(Continued)

(52) U.S. Cl.
CPC .......... *E21B 17/1078* (2013.01); *E21B 7/062* (2013.01); *E21B 7/067* (2013.01); *E21B 17/1064* (2013.01); *E21B 41/0085* (2013.01); *E21B 44/04* (2013.01); *E21B 47/024* (2013.01); *F16D 13/40* (2013.01); *G05B 19/182* (2013.01); *F16H 1/28* (2013.01); *G05B 2219/45129* (2013.01)

(58) Field of Classification Search
CPC ...... E21B 17/1078; E21B 7/062; E21B 7/067; E21B 17/1064; E21B 41/0085; E21B 44/04; E21B 47/024; G05B 19/182; G05B 2219/45129
See application file for complete search history.

(56) References Cited

U.S. PATENT DOCUMENTS 1,787,225 A * 12/1930 Wittkuhns ............... F16D 27/08
192/84.91
4,630,690 A * 12/1986 Beasley .................. F16D 1/094
175/325.5

(Continued)

FOREIGN PATENT DOCUMENTS

WO      2014142784 A1    9/2014
WO   WO 2014/142784    *  9/2014  ........... E21B 33/129

OTHER PUBLICATIONS

Combined Search and Examination Report for corresponding GB Application Serial No. GB1522039.5, dated Jul. 8, 2016, 5 pages.

*Primary Examiner* — Blake E Michener

(57) ABSTRACT

Active stabilization is provided. In one possible implementation a drilling tool associated with a drill bit includes one or more rotation alteration devices configured to alter a rotational radius of a drill string. The drilling tool also includes at least one active stabilizer rotatively attached to the drilling tool, as well as a variable brake configured to control a rotation of the at least one active stabilizer relative to the drilling tool. In another possible implementation, a drilling tool includes an active stabilizer rotatably coupled to the drilling tool, as well as an actuation system configured to control a torque placed on the active stabilizer through contact with a wall of a borehole.

16 Claims, 6 Drawing Sheets

(51) Int. Cl.
*E21B 44/04* (2006.01)
*G05B 19/18* (2006.01)

(56) References Cited

U.S. PATENT DOCUMENTS

| | | | |
|---|---|---|---|
| 4,989,679 A * | 2/1991 | Amaudric du Chaffaut | E21B 17/02 166/237 |
| 5,311,953 A * | 5/1994 | Walker | E21B 17/1014 175/107 |
| 2001/0047884 A1 | 12/2001 | Eddison | |
| 2002/0056574 A1 * | 5/2002 | Harvey | E21B 17/1014 175/320 |
| 2007/0079989 A1 * | 4/2007 | Bankston | E21B 41/0085 175/40 |
| 2009/0000826 A1 | 1/2009 | Schuh | |
| 2009/0020338 A1 * | 1/2009 | Stroud | E21B 29/00 175/320 |
| 2009/0242277 A1 * | 10/2009 | Radford | E21B 17/1078 175/57 |
| 2009/0272579 A1 * | 11/2009 | Sihler | E21B 7/064 175/45 |
| 2009/0308659 A1 * | 12/2009 | Crowley | E21B 17/1014 175/61 |
| 2010/0326731 A1 * | 12/2010 | Swietlik | E21B 17/1014 175/57 |
| 2011/0139513 A1 * | 6/2011 | Downton | E21B 7/067 175/61 |
| 2013/0220701 A1 * | 8/2013 | Crowley | E21B 17/073 175/40 |
| 2015/0252890 A1 * | 9/2015 | Singh | F16D 25/087 475/269 |
| 2015/0275588 A1 * | 10/2015 | Trowbridge | E21B 17/1078 166/241.6 |

* cited by examiner

ACTIVE STABILIZATION

BACKGROUND

Directional drilling can be used to connect a main well with one or more areas of interest in a subterranean reservoir. Directional drilling achieves this by guiding a drill bit while drilling a well, to keep its current orientation or to steer it into a different desired orientation, or sequence of orientations, on a desired path in the reservoir.

Often, the space on a drill bit and its associated tooling can be limited, making it difficult to carry power sources, such as batteries, downhole. Also, given the depths at which drilling can take place and/or the difficult well environments involved (in terms of corrosion, abrasion, etc.) it may be difficult to reliably transmit power from the surface down to the drill bit and its associated tooling via electrical wires, cables, etc.

SUMMARY

Active stabilization is provided. In one possible implementation a drilling tool associated with a drill bit includes one or more rotation alteration devices configured to alter a rotational radius of a drill string. The drilling tool also includes at least one active stabilizer rotatively attached to the drilling tool, as well as a variable brake configured to control a rotation of the at least one active stabilizer relative to the drilling tool. In another possible implementation, a drilling tool includes an active stabilizer rotatably coupled to the drilling tool, as well as an actuation system configured to control a torque placed on the active stabilizer through contact with a wall of a borehole. In yet another possible implementation, a computer-readable tangible medium includes instructions that, when executed, direct a processor to receive one or more signals from one or more sensors regarding a position of an active stabilizer in a borehole. The instructions can also direct an actuation system to control a torque received by the active stabilizer from a wall of the borehole to achieve a desired goal. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

As described herein, various techniques and technologies can facilitate the regulation of an amount of torque placed on an active stabilizer associated with a drilling tool. For example, in one possible implementation, torque placed on the stabilizer can be used to generate power. In another possible implementation, regulating the amount of torque placed on the active stabilizer can be used to steer an associated drill bit.

Figure 1:
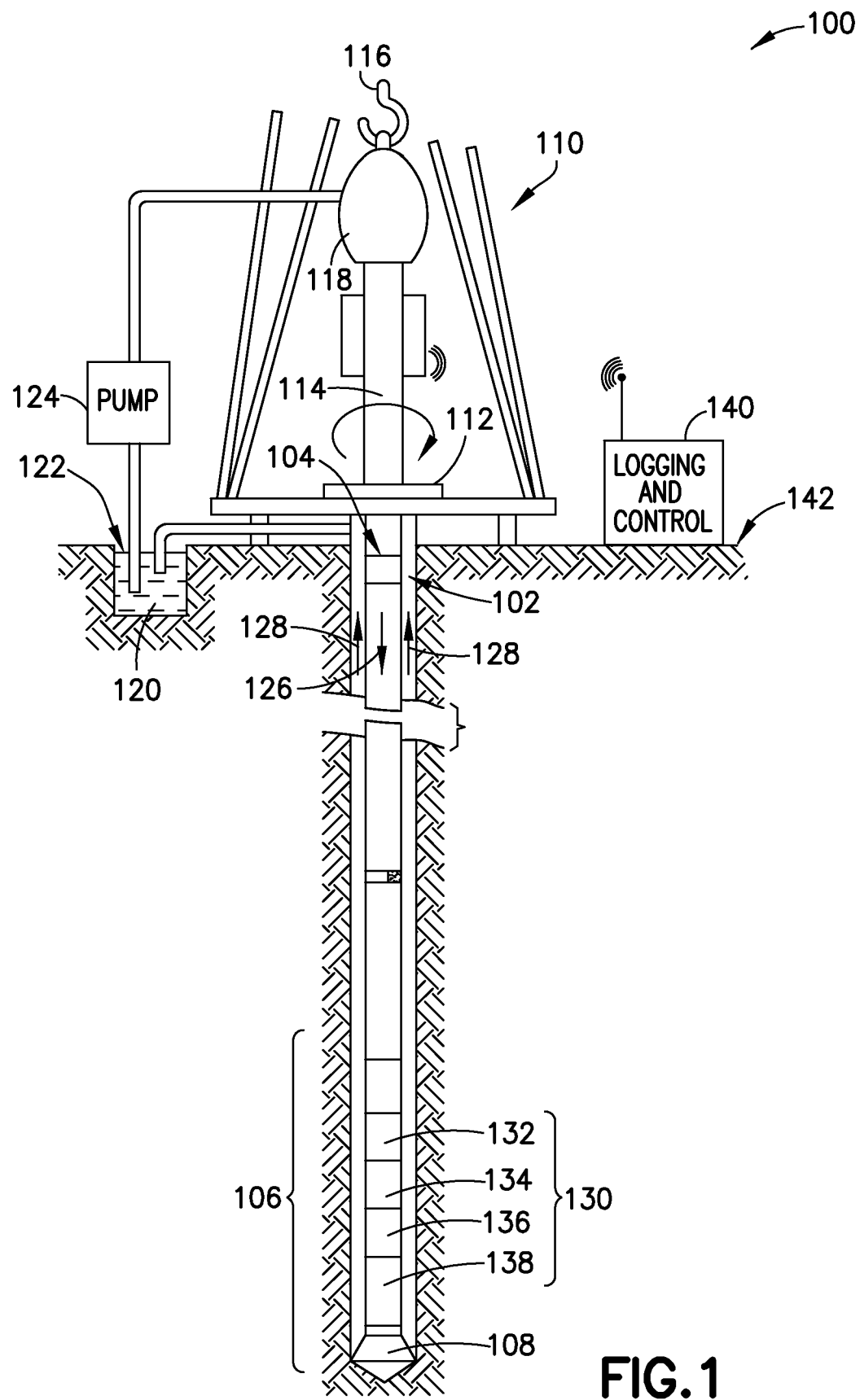
FIG. 1 illustrates an example wellsite in which embodiments of active stabilization can be employed.

FIG. 1 illustrates a wellsite 100 in which embodiments of active stabilization can be employed. Wellsite 100 can be onshore or offshore. In this example system, a borehole 102 is formed in a subsurface formation by rotary drilling in a manner that is well-known. Embodiments of active stabilization can also be employed in association with wellsites where directional drilling is being conducted.

A drill string 104 is suspended within the borehole 102 and has a bottom hole assembly 106 which includes a drill bit 108 at its lower end. The surface system includes a platform and derrick assembly 110 positioned over the borehole 102. The assembly 110 can include a rotary table 112, kelly 114, hook 116 and rotary swivel 118. The drill string 104 is rotated by the rotary table 112, energized by means not shown, which engages the kelly 114 at an upper end of the drill string 104. The drill string 104 is suspended from the hook 116, attached to a traveling block (also not shown), through the kelly 114 and a rotary swivel 118 which permits rotation of the drill string 104 relative to the hook 116. As is well known, a top drive system can also be used.

In the example of this embodiment, the surface system can further include drilling fluid or mud 120 stored in a pit 122 formed at the wellsite 100. A pump 124 delivers the drilling fluid 120 to the interior of the drill string 104 via a port in the swivel 118, causing the drilling fluid 120 to flow downwardly through the drill string 104 as indicated by the directional arrow 126. The drilling fluid 120 exits the drill string 104 via ports in the drill bit 108, and then circulates upwardly through the annulus region between the outside of the drill string 104 and the wall of the borehole 102, as indicated by the directional arrows 128. In this well-known manner, the drilling fluid 120 lubricates the drill bit 108 and carries formation cuttings up to the surface as the drilling fluid 120 is returned to the pit 122 for recirculation.

The bottom hole assembly 106 of the illustrated embodiment can include drill bit 108 as well as a variety of equipment 130, including a logging-while-drilling (LWD) module 132, a measuring-while-drilling (MWD) module 134, a rotary-steerable system and motor, a mud motor, various other tools, etc.

In one possible implementation, the LWD module 132 can be housed in a special type of drill collar, as is known in the art, and can include one or more of a plurality of known types of logging tools (e.g., a nuclear magnetic resonance (NMR system), a directional resistivity system, and/or a sonic logging system). It will also be understood that more than one LWD and/or MWD module can be employed (e.g. as represented at 136). (References, throughout, to a module at the position of 132 can also mean a module at the position of 136 as well.) The LWD module 132 can include capabilities for measuring, processing, and storing information, as well as for communicating with surface equipment.

The MWD module 134 can also be housed in a special type of drill collar, as is known in the art, and include one or more devices for measuring characteristics of the well environment, such as characteristics of the drill string 104 and drill bit 108. The MWD tool can further include an apparatus (not shown) for generating electrical power to the downhole system. This may include a mud turbine generator powered by the flow of the drilling fluid 120, it being understood that other power and/or battery systems may be employed. The MWD module 134 can include one or more of a variety of measuring devices known in the art including, for example, a weight-on-bit measuring device, a torque measuring device, a vibration measuring device, a shock measuring device, a stick slip measuring device, a direction measuring device, and an inclination measuring device.

In one implementation, bottom hole assembly 106 includes a drilling tool 138 having one or more active stabilizers configured to make contact with a wall of wellbore 102. In one possible implementation, drilling tool 138 can utilize the one or more active stabilizers to steer the drill 108 and any tools associated therewith. In some implementations, the active stabilizers on drilling tool 138 can be utilized to create electrical power that can be used, for example, to power one or more pieces of equipment 130.

Wellsite 100 can also include a logging and control system 140. Logging and control system 140 can be used with a wide variety of oilfield applications, including logging while drilling, artificial lift, measuring while drilling, etc. Logging and control system 140 can be located at surface 142, below surface 142, proximate to borehole 102, remote from borehole 102, or any combination thereof.

Example Drilling and Actuation Systems

Figure 2:
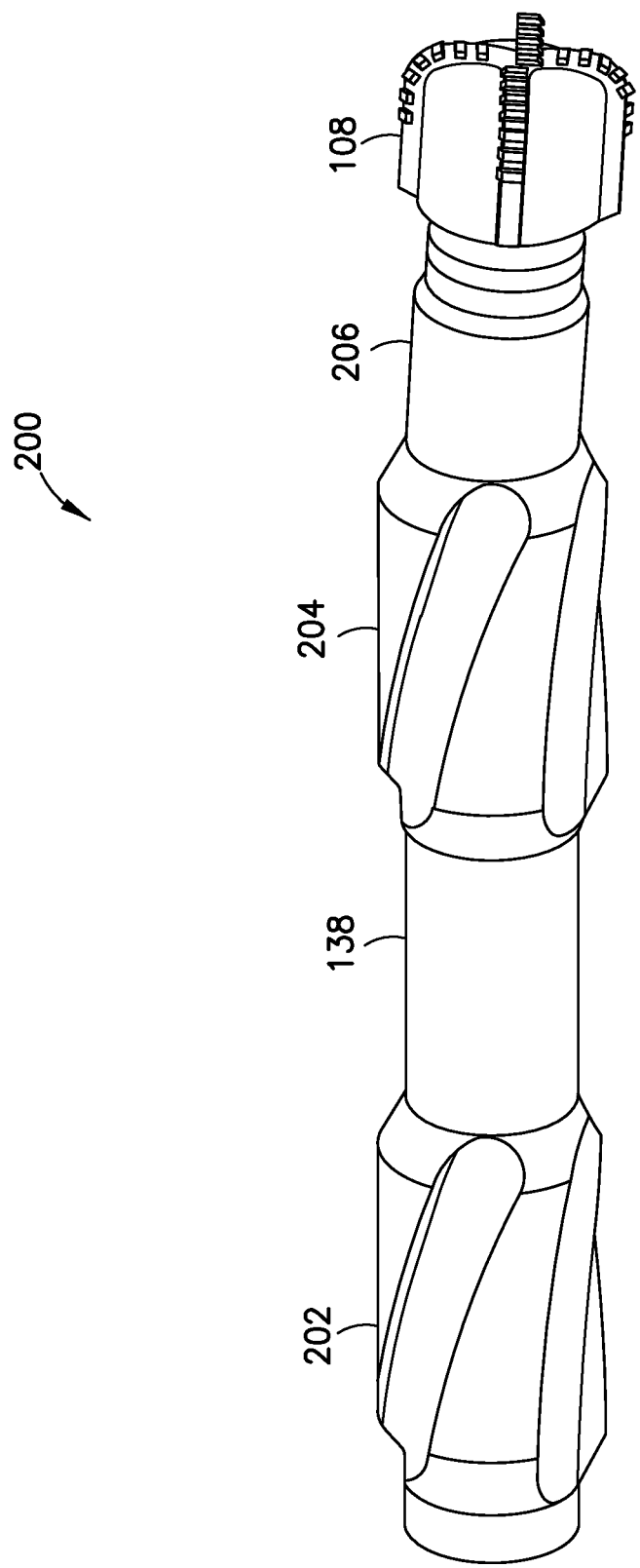
FIG. 2 illustrates an example drilling system that can be used with implementations of active stabilization.
Figure 3:
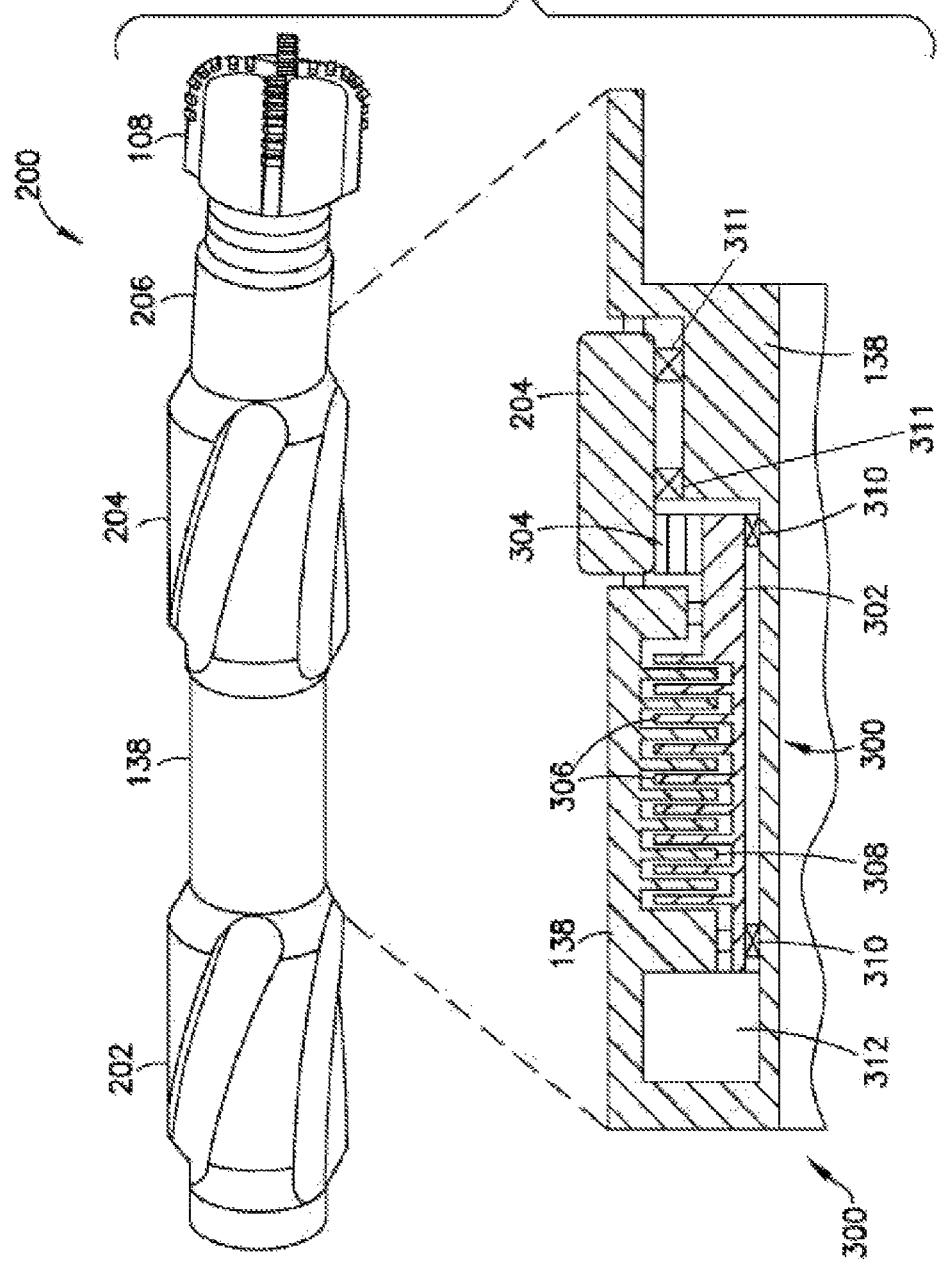
FIG. 3 illustrates an example actuation system that can be used with implementations of active stabilization.

FIGS. 2-3 illustrate example drilling and actuation systems in accordance with various embodiments of active stabilization. For example, in FIG. 2 a drilling system 200, including drill bit 108, is shown. In one possible aspect, drilling system 200 is a regular drilling system. In another possible aspect, drilling system 200 is a directional drilling system.

As shown, drilling system 200 can also include one or more fixed stabilizers 202 and one or more active stabilizers 204 associated with drilling tool 138. In one possible implementation, the one or more active stabilizers 204 can be used to steer drill bit 108 by, for instance, generating a net directional force on bit 108, resulting in bit 108 being influenced to cut in a desired direction. In another possible implementation, the one or more active stabilizers 204 can be used to generate electrical power downhole. In one possible implementation, one or more rotation alteration devices configured to alter a rotational radius of drill string 104, such as a bend 206 on drill string 104, can be present.

FIG. 3 illustrates an example actuation system 300 that can be used with drilling system 200. In one possible embodiment, actuation system 300 includes a variable brake 302, such as a dissipative brake, configured to regulate a rotation of active stabilizer 204 relative to drill tool 138.

Variable brake 302 can be coupled to active stabilizer 204 through any way known in the art. For example, in one possible embodiment, variable brake 302 can be coupled to active stabilizer 204 through a gearset 304 (such as a planetary gearset). In another possible embodiment, variable brake 302 can be in direct contact with active stabilizer 204, etc.

In one possible implementation, active stabilizer 204 can be allowed to rotate around drilling tool 138 via, for example, bearings 311 between active stabilizer 204 and drilling tool 138. In such an instance, brake 302 can be used to regulate a rotation of active stabilizer 204 relative to drilling tool 138, up to and including the stopping of rotation of active stabilizer 204 relative to drilling tool 138.

Variable brake 302 can be mechanical, electrical, or any other structural setup known in the art, including combinations of various structures. For instance, variable brake 302 can comprise a magnetorheological (MR) fluid brake, an electromagnetic actuator, a frictional brake, an electrorheological brake, etc.

FIG. 3 shows one possible implementation in which protrusions 306 associated with variable brake 302 are in proximity to protrusions 308 associated with drilling tool 138. In one possible implementation, forces such as electromagnetic forces between the protrusions 306, 308 can be used to attract protrusions 306, 308 to each other. In one possible aspect, this attraction can be regulated to decrease in any amount desired, including fully stopping, the motion of protrusions 306 and 308 relative to one another. In this manner, variable brake 302 can be engaged to influence a decrease or complete stop in the motion of active stabilizer 204 relative to drilling tool 138.

In another possible implementation, a substance with variable properties, such as magnetorheological (MR) fluid, can be placed between one or more of the protrusions 306 and 308. In such an instance, when braking is desired, the variable substance can be made more viscous to retard in any way desired, including fully stopping, movement of protrusions 306 and 308 relative to one another, effectively engaging variable brake 302 to decrease or completely stop the motion of active stabilizer 204 relative to drilling tool 138. In one possible implementation, the substance with variable properties can be influenced by subjecting it to a magnetic field, such as by applying electrical power to one or more of protrusions 306 and 308.

Actuation system 300 can also be used to generate electrical power. For example, in one possible implementation, actuation system 300 can generate power from the rotation of active stabilizer 204 relative to drilling tool 138. For instance, in one possible state, when active stabilizer 204 is in contact with a wall of borehole 102, variable brake 302 can be engaged to secure active stabilizer 204 to drilling tool 138, stopping rotation of active stabilizer 204 relative to drilling tool 138. Such a state will avoid the creation of electrical power.

If, however, it is desired to generate electrical power, variable brake 302 can be manipulated to allow active stabilizer 204 to rotate relative to drilling tool 138 at whatever speed is desired. In such an implementation, rotation from active stabilizer 204 can be transmitted to variable brake 302 allowing variable brake 302 to rotate relative to drilling tool 138. It will be understand that relative rotation can mean that both parts are moving, or only one part is moving. For example, in one possible embodiment, relative rotation can occur when variable brake 302 remains stationary and drilling tool 138 rotates.

In one implementation, such relative rotation between variable brake 302 and drilling tool 138 can be facilitated by bearings, such as bearings 310 between variable brake 302 and drilling tool 138. In other implementations rotation of variable brake 302 relative to drilling tool 138 can be facilitated by any other technology known in the art.

In one possible embodiment, as relative rotation occurs between variable brake 302 and drilling tool 138, relative motion occurs between one or more of the respective protrusions 306 and 308 of variable brake 302 and drilling tool 138, allowing variable brake 302 and drilling tool 138 to act as a rotor and stator, respectively, and thereby generate electrical power.

It will also be understood that current can be applied to one or more of protrusions 306 and 308 and/or permanent magnets can be deployed on one or more of protrusions 306 and 308 to create any configuration known in the art that might be of use in creating electrical power from the movement of protrusions 306 and 308 relative to one another. For example, one or more of the protrusions 308 can be configured to act as a rotor while one or more of protrusions 306 can be configured to act as a stator to produce electrical power.

A power generator 312 of any configuration known in the art can be used to harvest the electrical power created by the relative movement of protrusions 306 and 308 to one another. In one possible implementation, this power can be used, for example, to actuate the variable brake 302. Power from power generator 312 can also be used to power a wide variety of devices and tools, such as one or more devices in equipment 130 including, for example, logging-while-drilling (LWD) module 132, measuring-while-drilling (MWD) module 134, etc. Power from power generator 312 can also be stored, for example, in a battery, for possible later use by equipment 130, variable brake 302, etc.

In addition to creating power, drilling system 200 can also be used to steer drill bit 108 and its associated drill string 104 in a desired direction. It will be understood that one or both of these endeavors may be pursued as desired goals. For example, both steering and power generation can be pursued simultaneously. In another possible implementation, steering can be pursued without power generation. In yet another possible implementation, power generation can be pursued without steering.

In one possible embodiment, when steering of drill bit 108 is desired, a side force can be exerted on drill bit 108 by allowing a rotational degree-of-freedom on one or more of the active stabilizers 204 and/or by using actuation system 300 to control and modulate a torque between the drill string 104 and the one or more active stabilizers 204.

For example, by making active stabilizer 204 larger in outside dimensions than the rest of the neighboring drilling tool 138, contact between active stabilizer 204 and the formation being drilled can be promoted as drill bit 108 rotates. During such contact a normal force can be generated between drill bit 108 and the formation. Further, there can be a tangential force on the drill string 104 caused by relative tangential motion and the presence of friction between drill string 104 and the formation. In cases where active stabilizer 204 is free to rotate relative to drilling tool 138, transmission of the tangential force on the drill string 104 can be relatively small as the friction between the stabilizer and the drill string 104 can be designed to be low.

However, in another possible implementation, if variable brake 302 is used to apply a torque on active stabilizer 204 to stop or impede the rotation of active stabilizer 204, then the tangential force can be transmitted onto the drill string 104 and drilling tool 138.

In one possible embodiment, when drill bit 108 is rotating, a direction of the tangential force can be approximately normal to an axis of the drilling tool 138, resulting in a contact force at drill bit 138 in the same direction as the tangential force which can be used to steer drill bit 138. Therefore, in one possible implementation, by controlling a torque on active stabilizer 204, drill string 104 can be steered in a desired direction.

Figure 4:
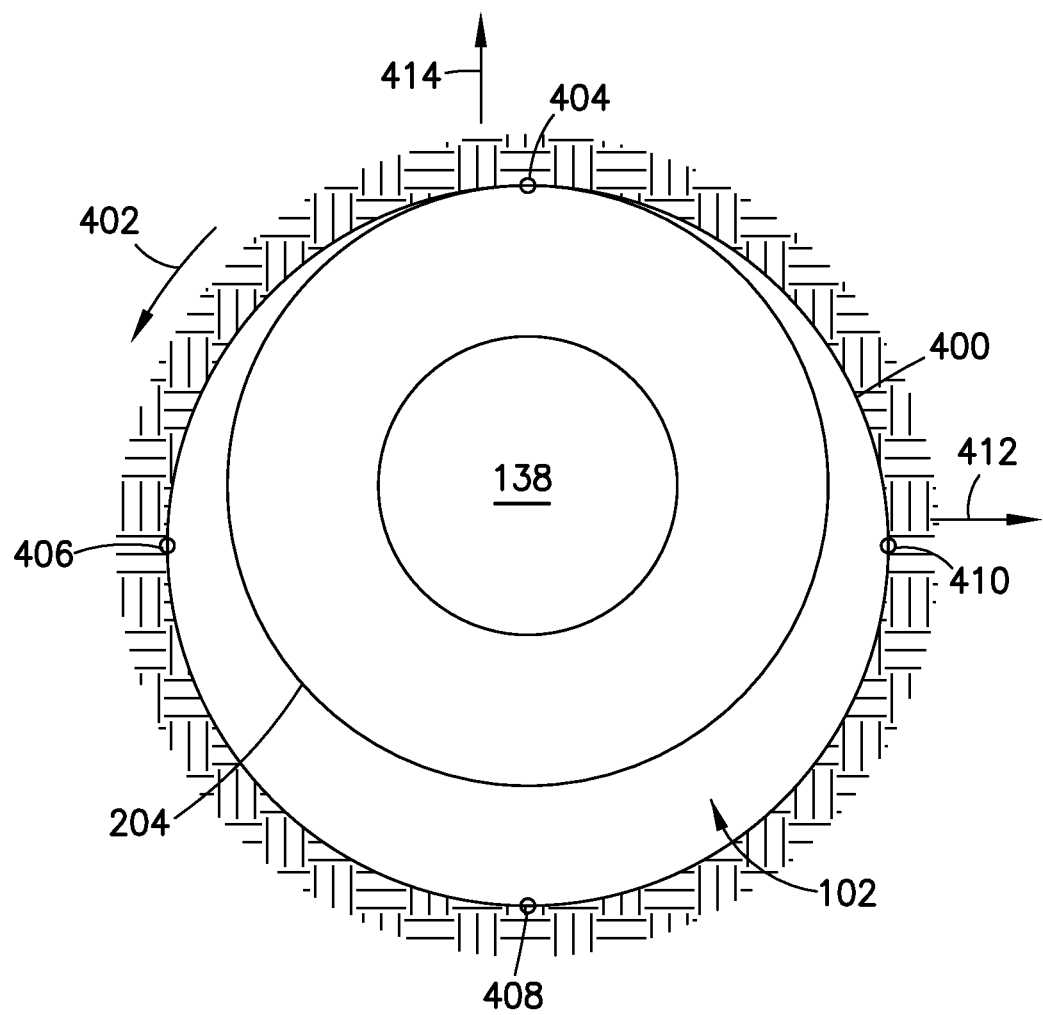
FIG. 4 illustrates example interactions of a drilling system with a borehole in accordance with various implementations of active stabilization.

FIG. 4 illustrates a cross-sectional view of various possible forms of contact between active stabilizer 204 and a wall 400 of borehole 102. In one implementation, as drill bit 108 rotates, drill string 104 and drilling tool 138 can move around inside of borehole 102. For example, drilling tool 138 can rotate around borehole 102 resulting in active stabilizer 204 contacting wall 400 at numerous locations. In one possible aspect, as drill bit 108 rotates in direction 402, drilling tool 138 can rotate and active stabilizer 204 can contact wall 400 at location 404 before then contacting locations 406, 408 and 410. The trajectory of active stabilizer 204 around the inside of borehole 102 can be continuous (i.e. active stabilizer contacts all points between locations 404, 406, 408 and 410 as it rotates in borehole 102) or it can be discrete (i.e. contacting one or more locations like locations 404, 406, 408 and 410 on wall 400 as it rotates in borehole 102).

In one possible implementation, each instance of contact between active stabilizer 204 and wall 400 can represent an opportunity to create electrical power (as discussed above) and/or to influence the direction of drill bit 108. For example, as active stabilizer 204 contacts wall 400 at any point, active stabilizer 204 can be allowed to rotate relative to drilling tool 138, thus allowing relative movement between one or more of protrusions 306 and 308 which can be used by the various mechanisms discussed above to create electrical power.

Alternately, or additionally, as active stabilizer 204 contacts wall 400, brake 304 can be used to slow or stop a rotation of active stabilizer 204 relative to drilling tool 138 and create a tangential steering force on drilling tool 138 and drill bit 108. For example, when drill bit 108 is rotating in direction 402 (into the page), if a breaking force is applied while active stabilizer 204 contacts wall 400 at or near to location 404, drill bit 108 will be influenced to travel in direction 412. Similarly, when drill bit 108 is rotating in direction 402 (into the page), if a breaking force is applied when active stabilizer 204 contacts wall 400 at or near to location 406, drill bit 108 will be influenced to travel in direction 414.

In one possible implementation, it may be desirable to increase the number of contacts between active stabilizer 204 and wall 400 per revolution of drill bit 108. In another possible implementation, it may be desirable to distribute the contacts of active stabilizer 204 to wall 400 evenly around the borehole.

For instance, more contacts may result in more opportunities to generate electrical power and/or steer drill bit 108. One way this can be done is to introduce one or more rotation alteration devices configured to alter a rotational radius of drill string 104. The term rotational radius, as used herein, corresponds to an extent to which drill string 104 bows away from an axis of rotation that drill string 104 would otherwise have if it were symmetric and straight.

For example, one or more bends 206 in drilling tool 138 and/or drill string 104 can be employed to influence active stabilizer 204 away from a rotational axis of drilling tool 138 towards wall 400. Bends 206 could be permanent, or they could be influenced dynamically as desired. In one possible implementation, several active stabilizers 204 can be utilized, each with its own bend 206. In one possible embodiment, two active stabilizers 204 can be associated with bends 206 in different directions, such as a zig zag configuration, possibly increasing contact between active stabilizers 204 and wall 400 during a cycle of rotation of drill bit 108. In another possible implementation, three or more active stabilizers can be used.

In one possible implementation, bends 206 located closer to active stabilizer 204 and/or drill bit 108 may have an increased effect on drilling system 200 to influence steering of drill bit 108.

Another type of rotation alteration device can include the creation of a mass imbalance between active stabilizer 204 and drilling tool 138 and/or drill string 104. During rotation of drilling tool 138 such a mass imbalance could cause a dynamic radial load, thereby potentially increasing and distributing contacts between active stabilizer 204 and wall 400.

Such an imbalance could be accomplished, for example, by creating a weight imbalance between active stabilizer 204 and drilling tool 138 and/or drill string 104, constructing active stabilizer 204 out of material that has a different density that of drilling tool 138 and/or drill string 104, etc.

Still another type of rotation alteration device can include creating an offset between an axis of rotation of the active stabilizer 204 and an axis of rotation of the drill string 104. For example, active stabilizer 204 can be made to protrude in any way known in the art from drilling tool 138, including in an unbalanced fashion in which one side of active stabilizer 204 protrudes from drilling tool 138 more than another side of active stabilizer 204. In one possible implementation, the protrusion can be influenced dynamically to increase or decrease as desired the offset between an axis of rotation of the active stabilizer 204 and an axis of rotation of the drill string 104.

It will be understood that the rotation alteration devices discussed above can be employed in any possible combination. For example, one or more active stabilizers 204 can be employed with one or more associated bends 206, mass imbalances and/or one or more offsets between an axis of rotation of the active stabilizers 204 and an axis of rotation of the drill string 104.

In one possible embodiment, the steering direction of drilling system 200 can be determined by how the actuator torque applied to active stabilizer 204 is modulated. For example, a steering direction for drill bit 108 can be created using information from various sensors to determine where active stabilizer 204 is in borehole 102 at a given time. Sensor information that can be used for this can include information on acceleration, gravity, magnetic field, velocity, shear stress, bending moment on drill string 104, etc.

For example, returning to our example above, when drill bit 108 is rotating in direction 402 (while travelling into the page), if it is desired to steer drill bit 108 in direction 412, a breaking force can be applied to active stabilizer 204 when sensor information indicates that active stabilizer 204 is in contact with wall 400 at or near to location 404.

In one possible implementation, a rate of change of the direction of drill bit 108 exerted by drilling system 200 can be associated with how frequently a breaking force is applied to active stabilizer 204. For example, if it is desired to rapidly steer drill bit 108 in direction 412 when drill bit 108 is rotating in direction 402 (into the page), a breaking force can be applied every time active stabilizer 204 is in contact with wall 400 at or near to location 404. In one possible implementation, "at or near to" as used herein can include plus or minus 45 degrees. Of course other ranges could also be used depending on the desires of a potential operator.

If a more gradual change of direction is desired, a breaking force can be applied less frequently, such as every other time, every third time, every fourth time, etc., active stabilizer 204 is in contact with wall 400 at or near to location 404.

Similarly, the magnitude of the braking force applied to active stabilizer 204 can be varied to influence the speed at which drill bit 108 changes direction. For example, stopping a rotation of active stabilizer 204 fully with relation to drilling tool 138 when active stabilizer 204 is in contact with wall 400 will have more of an effect than slowing the rotation of active stabilizer 204 with relation to drilling tool 138 when active stabilizer 204 is in contact with wall 400.

Example Method(s)

Figure 5:
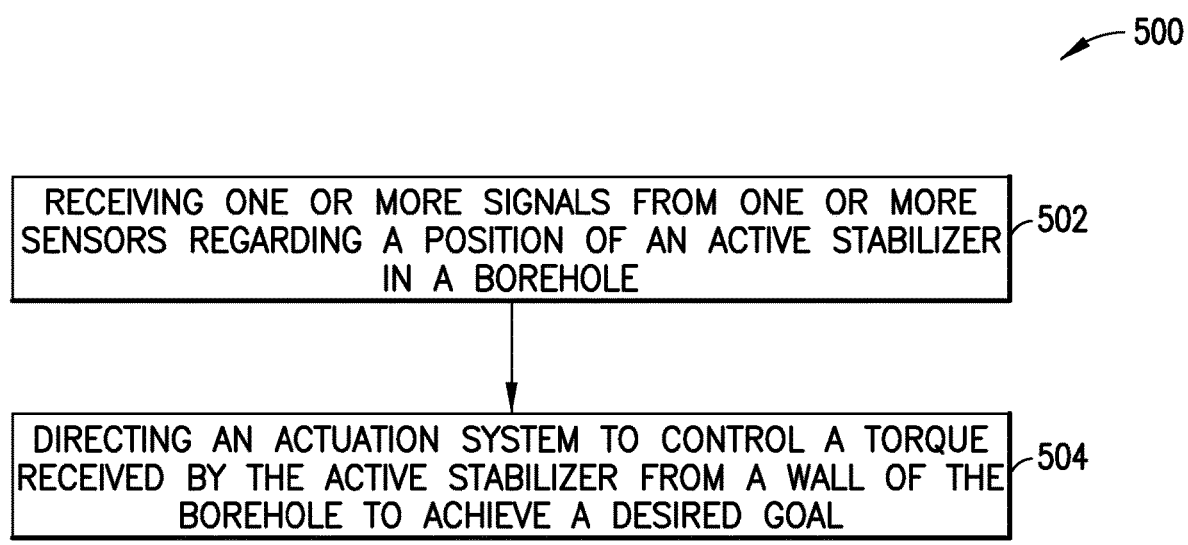
FIG. 5 illustrates an example method in accordance with various implementations of active stabilization.

FIG. 5 illustrates an example method 500 for implementing aspects of active stabilization. The method is illustrated as a collection of blocks and other elements in a logical flow graph representing a sequence of operations that can be implemented in hardware, software, firmware, various logic or any combination thereof. The order in which the method is described is not intended to be construed as a limitation, and any number of the described method blocks can be combined in any order to implement the method, or alternate methods. Additionally, individual blocks and/or elements may be deleted from the method without departing from the spirit and scope of the subject matter described therein. In the context of software, the blocks and other elements can represent computer instructions that, when executed by one or more processors, perform the recited operations. Moreover, for discussion purposes, and not purposes of limitation, selected aspects of the methods may be described with reference to elements shown in FIGS. 1-4.

For example, at block 502 one or more signals from one or more sensors can be received regarding a position of an active stabilizer, such as active stabilizer 204, in a borehole, such as borehole 102. For instance, information from a variety of sensors on a drill string, such as drill string 104, and/or in a borehole, and/or in an adjacent borehole, and/or elsewhere, can be received. Sensor information of this type can include acceleration, gravity, magnetic field, velocity, shear stress, bending moment on the drill string, etc. In one possible implementation this information can be received by equipment associated with the drill string, such as equipment 130, and/or remotely from the drill string, such as by logging and control system 140. Once received, the sensor information can be used to infer where the active stabilizer is in the borehole at a given point in time, such as if it is in contact with a wall, such as wall 400, of the borehole at a given location, like location 404.

FIG. 5 depicts a method of directing an actuation system, such as actuation system 300. At block 504, this is activated to control a torque received by the active stabilizer from a wall of the borehole to achieve a desired goal. In one implementation the desired goal can be to influence the direction of cutting of a drill bit. For example, if the active stabilizer is contacting a wall of the borehole in a location where a breaking force can be applied to influence a drill bit, such as drill bit 108, to cut in a desired direction, the braking force can be applied. In one possible embodiment, steering can be more pronounced the more frequently it is done. In another possible implementation, steering can be more pronounced the more a rotation of the active stabilizer is slowed relative to the drilling tool.

In one possible implementation, a variety of information associated with the drill bit can be received from sensors associated with the drill bit, and/or an associated drill bit string, etc. The information can include, for example, the position of the drill bit, its orientation, its direction of drilling, or anything else that might be of interest to an operator of the drill bit.

In another possible embodiment, the desired goal can be to generate electricity by allowing the active stabilizer to rotate relative to the drilling tool, such as drilling tool 138. In one possible implementation this can be accomplished using the methods described above, with for example, a stator and rotor configuration such as that described in relation to actuation system 300.

Example Computing Device

Figure 6:
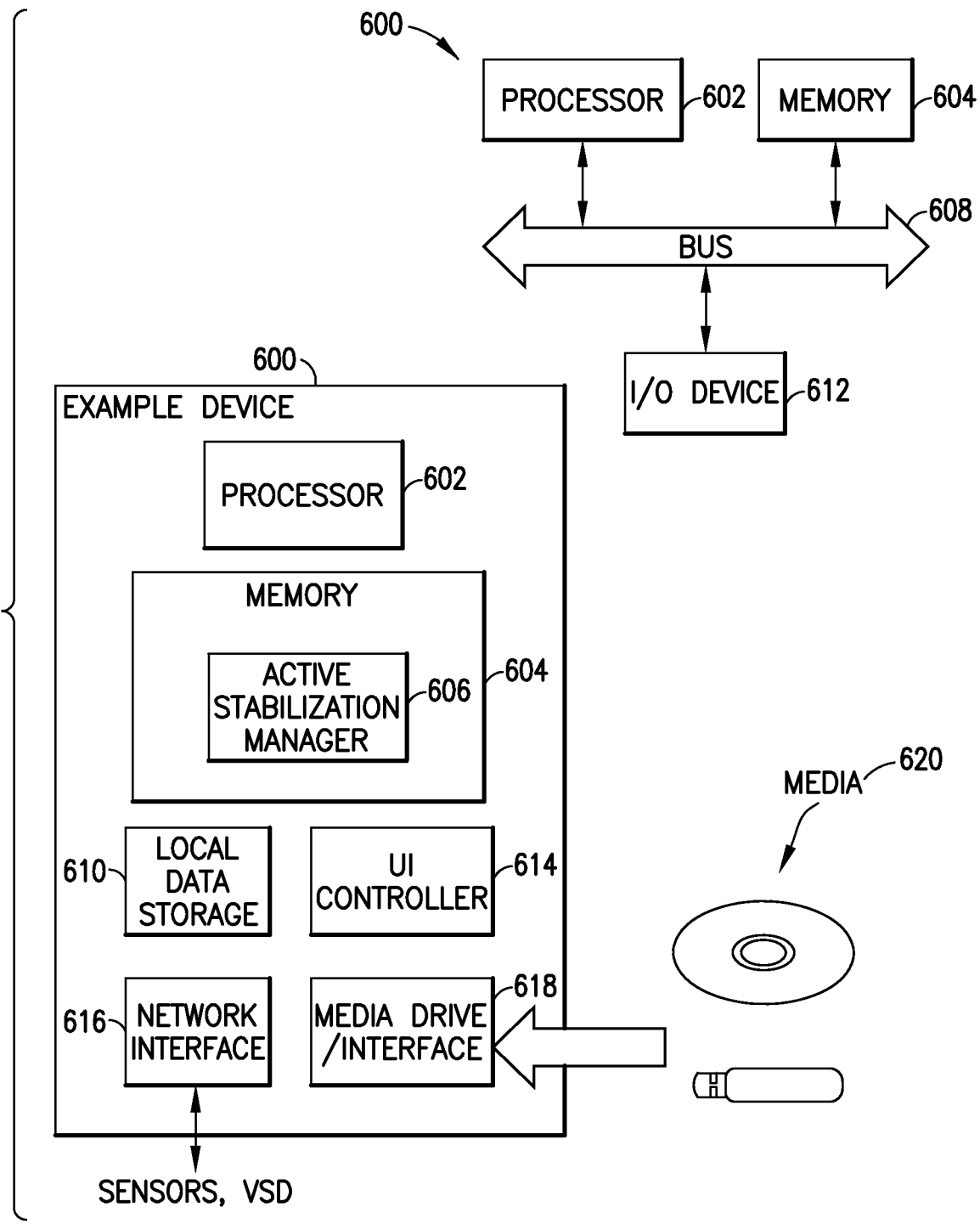
FIG. 6 illustrates an example computing device that can be used in accordance with various implementations of active stabilization.

FIG. 6 shows an example device 600, with a processor 602 and memory 604 for hosting an active stabilization manager 606 configured to implement various embodiments of active stabilization as discussed in this disclosure. Memory 604 can also host one or more databases, and can include one or more forms of volatile data storage media such as random access memory (RAM)), and/or one or more forms of nonvolatile storage media (such as read-only memory (ROM), flash memory, and so forth).

Device 600 is one example of a computing device or programmable device, and is not intended to suggest any limitation as to scope of use or functionality of device 600 and/or its possible architectures. For example, device 600 can comprise one or more computing devices, programmable logic controllers (PLCs), etc.

Further, device 600 should not be interpreted as having any dependency relating to one or a combination of components illustrated in device 600. For example, device 600 may include one or more of a computer, such as a laptop computer, a desktop computer, a mainframe computer, etc., or any combination or accumulation thereof.

Device 600 can also include a bus 608 configured to allow various components and devices, such as processors 602, memory 604, and local data storage 610, among other components, to communicate with each other.

Bus 608 can include one or more of any of several types of bus structures, including a memory bus or memory controller, a peripheral bus, an accelerated graphics port, and a processor or local bus using any of a variety of bus architectures. Bus 608 can also include wired and/or wireless buses.

Local data storage 610 can include fixed media (e.g., RAM, ROM, a fixed hard drive, etc.) as well as removable media (e.g., a flash memory drive, a removable hard drive, optical disks, magnetic disks, and so forth).

A input/output (I/O) device 612 may also communicate via a user interface (UI) controller 614, which may connect with I/O device 612 either directly or through bus 608.

In one possible implementation, a network interface 616 may communicate outside of device 600 via a connected network, and in some implementations may communicate with hardware, such as one or more sensors, etc.

In one possible embodiment, sensors may communicate with system 600 as input/output devices 612 via bus 608, such as via a USB port, for example.

A media drive/interface 618 can accept removable tangible media 620, such as flash drives, optical disks, removable hard drives, software products, etc. In one possible implementation, logic, computing instructions, and/or software programs comprising elements of the active stabilization manager 606 may reside on removable media 620 readable by media drive/interface 618.

In one possible embodiment, input/output devices 612 can allow a user to enter commands and information to device 600, and also allow information to be presented to the user and/or other components or devices. Examples of input devices 612 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

In one possible implementation, active stabilization manager 606 can include functionality to implement various aspects of active stabilization as described herein. Also, various processes of active stabilization manager 606 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A drilling system, comprising:
    a drilling tool associated with a drill bit;
    at least one rotation alteration device configured to alter a rotational radius of the drilling tool;
    at least one active stabilizer located on and rotatively attached to the drilling tool; and
    a variable brake coupled to the at least one active stabilizer via a gearset and configured to control rotation of the at least one active stabilizer relative to the drilling tool, wherein the variable brake has a configuration that stops rotation of the at least one active stabilizer relative to the drilling tool;
    wherein a part of the variable brake and a corresponding part of the drilling tool act as a rotor and stator configured to create electric current from relative rotation of the variable brake and the drilling tool.

2. The drilling system of claim 1, wherein the at least one rotation alteration device comprises at least one of:
    a bend in the drilling tool;
    a mass imbalance in the drilling tool; and
    an offset between an axis of rotation of the at least one active stabilizer and an axis of rotation of the drilling tool.

3. The drilling system of claim 1, further comprising a fixed stabilizer.

4. The drilling system of claim 1, wherein the variable brake is a magnetorheological brake.

5. The drilling system of claim 1, wherein the electric current is used to supply power to one or more downhole tools associated with the drilling tool.

6. The drilling system of claim 1, wherein the variable brake is configured to influence a direction of the drill bit by controlling an amount of force placed on the at least one active stabilizer with a wall of a borehole.

7. The drilling system of claim 1, wherein the gearset is a planetary gearset.

8. The drilling system of claim 1, further comprising bearings between the at least one active stabilizer and the drilling tool.

9. The drilling system of claim 1, further comprising bearings between the variable brake and the drilling tool.

10. The drilling system of claim 1, wherein the part of the variable brake and the corresponding part of the drilling tool that act as a rotor and stator comprise protrusions of the variable brake and protrusions of the drilling tool that are disposed adjacent to one another and that rotate relative to one another.

11. The drilling system of claim 10, wherein electromagnetic forces between the protrusions of the variable brake and the protrusions of the drilling tool are used to attract the protrusions of the variable brake and the protrusions of the drilling tool to each other and configured to engage the variable brake.

12. The drilling system of claim 10, wherein a magnetorheological fluid between the protrusions of the variable brake and the protrusions of the drilling tool is used to retard relative movement of the protrusions of the variable brake and the protrusions of the drilling tool and configured to engage the variable brake.

13. The drilling system of claim 1, wherein the part of the variable brake and the corresponding part of the drilling tool that act as a rotor and stator create electric current when the variable brake remains stationary and the drilling tool rotates.

14. A non-transitory computer-readable tangible medium with instructions stored thereon that, when executed, direct a processor to perform operations regarding a drilling tool having (i) a drill bit, (ii) an active stabilizer located on and rotatably attached to the drilling tool and having one or more accompanying sensors, (iii) a gearset engaging the active stabilizer, and (iv) a variable brake engaging the gearset with the active stabilizer and variable brake coupled by the gearset, the active stabilizer and the variable brake having respective protrusions that act as a rotor and stator configured to create electric current from relative rotation of the variable brake and the drilling tool, the operations comprising:
   receiving one or more signals from the one or more sensors regarding a position of the active stabilizer relative to the drilling tool in a borehole;
   directing the variable brake to control a torque received by the active stabilizer from a wall of the borehole to achieve a desired goal; and
   controlling a motion of the active stabilizer due to the protrusions of the brake interacting with protrusions of the drilling tool and due to the active stabilizer engaging the gearset and the gearset engaging the brake.

15. The non-transitory computer-readable medium of claim 14, further including instructions to direct the processor to perform operations comprising:
   receiving the one or more signals from the one or more sensors regarding one or more of:
   a position of the drill bit;
   an orientation of the drill bit;
   a direction of drilling of the drill bit;
   computing a desired direction of the drill bit to keep the drill bit on a desired trajectory; and
   directing the variable brake to control the torque received by the active stabilizer from the wall of the borehole to influence the drill bit to go in the desired direction.

16. The non-transitory computer-readable medium of claim 14, further including instructions to direct the processor to perform operations comprising:
   directing the variable brake to control a torque received by the active stabilizer from the wall of the borehole such that the respective protrusions of the active stabilizer and the variable brake generate a desired amount of power.

* * * * *